US006744383B1

(12) United States Patent
Alfred et al.

(10) Patent No.: US 6,744,383 B1
(45) Date of Patent: Jun. 1, 2004

(54) INTELLIGENT ROADWAY SYSTEM

(75) Inventors: Joseph Anderson Alfred, Somerset, NJ (US); Joseph M. Sommer, Rutherford, NJ (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 10/295,293

(22) Filed: Nov. 15, 2002

Related U.S. Application Data

(63) Continuation of application No. 09/495,662, filed on Feb. 1, 2000.

(51) Int. Cl.$^{7}$ .......................... H04Q 7/20; G01C 21/26

(52) U.S. Cl. ....................... 340/988; 701/207; 455/457; 455/456.5; 455/456.3

(58) Field of Search ................................ 340/988, 990, 340/995; 455/421, 422, 456, 457; 701/201, 202, 209, 210, 207; 705/28; 703/456.1, 456.2, 456.3, 456.4, 456.5, 456.6

(56) References Cited

U.S. PATENT DOCUMENTS 4,303,904 A 12/1981 Chasek
4,812,843 A 3/1989 Champion, III et al.
5,406,275 A 4/1995 Hassett et al.
5,424,727 A 6/1995 Shieh
5,485,520 A 1/1996 Chaum et al.
5,490,079 A 2/1996 Sharpe et al.
5,696,503 A 12/1997 Nasburg
5,710,702 A 1/1998 Hayashi et al.
5,717,389 A 2/1998 Mertens et al.
5,729,458 A 3/1998 Poppen
5,742,914 A * 4/1998 Hagenbuch .................. 701/35
5,801,943 A 9/1998 Nasburg
5,819,234 A 10/1998 Slavin et al.
5,933,114 A 8/1999 Eizenhofer
5,953,657 A 9/1999 Ghisler
5,974,397 A 10/1999 Olsson et al.
6,084,510 A 7/2000 Lemelson et al.
6,094,644 A 7/2000 Hillson et al.
6,109,525 A 8/2000 Blomqvist et al.
6,167,333 A 12/2000 Gehlot
6,188,899 B1 * 2/2001 Chatterjee et al. ....... 455/435.1
6,199,013 B1 * 3/2001 O'Shea ....................... 701/211
6,222,463 B1 4/2001 Rai
6,252,523 B1 6/2001 Mostrom
6,252,544 B1 * 6/2001 Hoffberg ................. 342/357.1
6,253,129 B1 6/2001 Jenkins et al.
6,259,377 B1 7/2001 Noecker et al.
6,292,747 B1 * 9/2001 Amro et al. ................ 701/213
6,298,301 B1 10/2001 Kim
6,310,542 B1 10/2001 Gehlot
6,317,721 B1 11/2001 Hurta et al.
6,360,167 B1 3/2002 Millington et al.
6,381,537 B1 * 4/2002 Chenault et al. ............ 701/209
6,388,581 B1 5/2002 Barker et al.
6,389,290 B1 5/2002 Kikinis et al.
6,390,365 B1 * 5/2002 Karasawa ................... 235/384
6,486,801 B1 * 11/2002 Jones ......................... 340/994
6,553,308 B1 * 4/2003 Uhlmann et al. ........... 701/208

OTHER PUBLICATIONS

Cheryl Ajuni, "Intelligent transportation systems hit the road", Electronic Design; Rochelle Park, Jun. 23, 1997, 5 pages.*

Messmer, Ellen, "Wireless technologies to pave way for private road," *Network World*, vol. 10, Issue 6, Network World, Inc., Framingham, Feb. 8, 1993, p. 9–10, http.//proquest.umi.com.

* cited by examiner

*Primary Examiner*—Robert P. Olszewski
*Assistant Examiner*—Andrew Joseph Rudy
(74) *Attorney, Agent, or Firm*—Perkins Coie LLP

(57) ABSTRACT

An intelligent roadway system is configured to detect and track a usage of a roadway by a vehicle by identifying a wireless device carried on the vehicle. The account of the user, associated with the wireless device, is charged for the usage of the roadway based on the detected information through the wireless device. Road services, such as directions, road conditions, weather forecast and traffic status may also be provided interactively through the wireless device while the vehicle is on the roadway.

14 Claims, 5 Drawing Sheets

FIG. 2
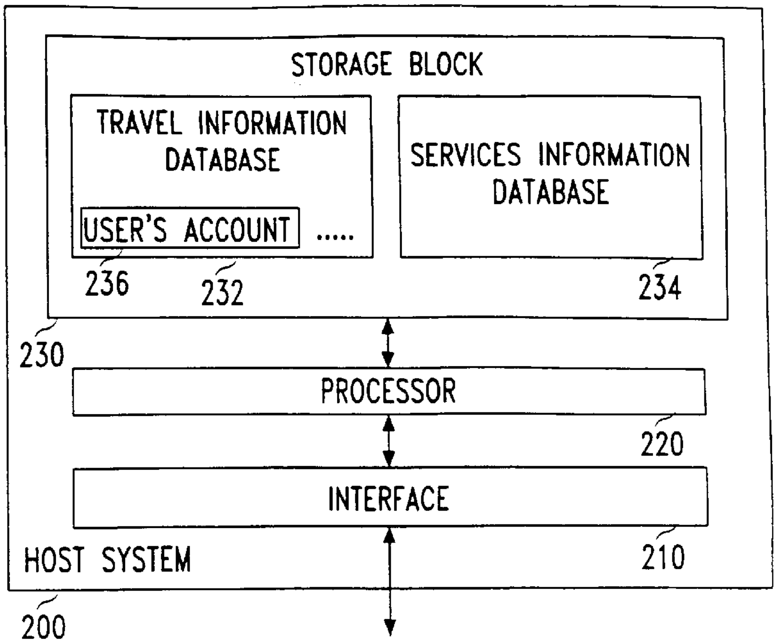
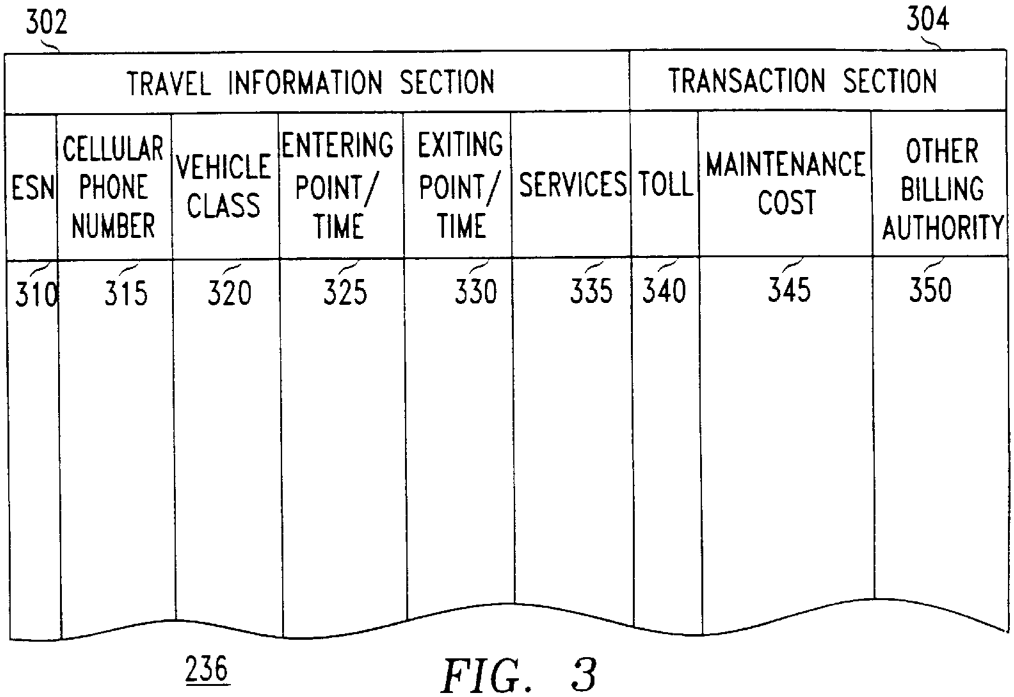
FIG. 3

INTELLIGENT ROADWAY SYSTEM

This application is a continuation of U.S. patent application No. 09/495,662, filed Feb. 1, 2000, which is incorporated herein by reference in its entirety.

FIELD OF THE INVENTION

This invention relates to an intelligent roadway system. More particularly, the present invention relates to utilizing wireless device technology to provide an intelligent roadway system.

BACKGROUND OF THE INVENTION

Although, there have been improvement in roadway control systems over the past several years to provide better services for roadway users, many problems still exist and remain unresolved.

As an example, same roadway systems employ video cameras at pressure sensitive zones of a roadway to feed back traffic information of the zones which is then relayed to the users. However, video cameras are not pervasive on the roadways and the traffic information provided by these cameras is often untimely. These video cameras are also affected by weather conditions such as snow, leaves, rain and intense sunlight.

As another example, tollbooths have been widely used where cars must stop to make a payment. This slows down traffic and often leads to traffic jams particularly on heavily used roadways. Automated toll collecting systems, such as "EZ pass" have been introduced to reduce waiting time of drivers on tollbooths of roadway. However, these systems still require the use of tollbooths for charging pre-paid debit cards.

Moreover, the cost of maintaining roadways, such as repairing roadways and building new roadways or bridges, is not always fairly charged based on the usage of roadways because of the lack of information on the usage of roadways as well as the inability to efficiently track roadway usage to a particular user.

SUMMARY OF THE INVENTION

In accordance with an aspect of this invention, there is provided an intelligent roadway system which is configured to detect and track a usage of a roadway by a vehicle by identifying a wireless device carried on the vehicle. The account of the user, associated with the wireless device, is charged for the usage of the roadway based on the detected information through the wireless device. The billing information may be transferred to a predetermined billing authority based on the user's selection.

In accordance with another aspect of this invention, road services, such as directions, weather forecast and traffic status information, are provided interactively through the wireless device while the vehicle is on the roadway.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 2 is a block diagram of the host system of the intelligent roadway system of FIG. 1;

FIG. 3 is an example of an user's account on the database of the host system;

DETAILED DESCRIPTION

Figure 1:
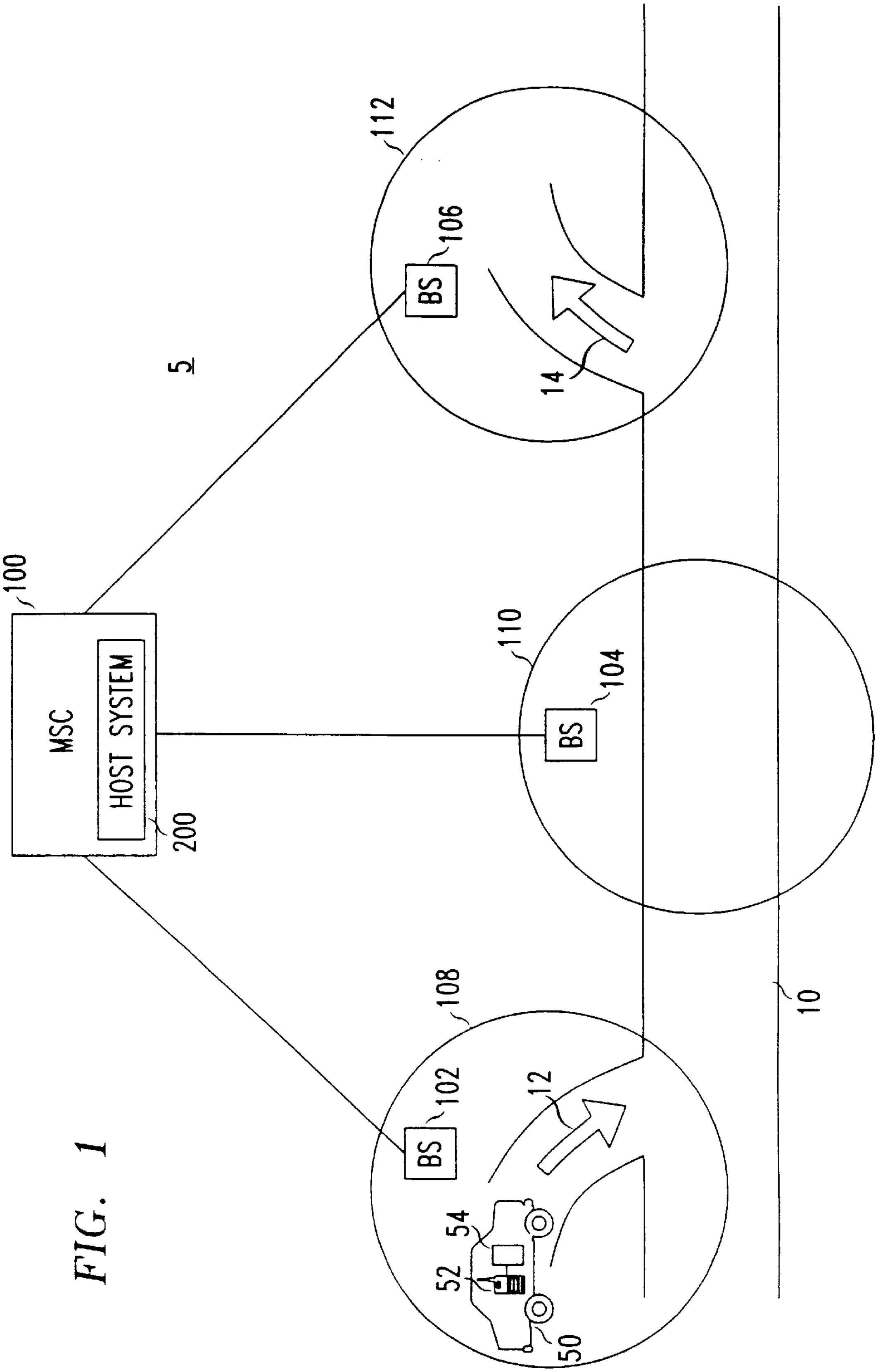
FIG. 1 is a view of an intelligent roadway system in accordance with one embodiment.

FIG. 1 is an overview of intelligent roadway system 5 in accordance with one embodiment. Intelligent roadway system 5 is configured to detect a usage of a roadway by a vehicle through a wireless device on the vehicle and to charge an account of the wireless device based on the tracked usage of the roadway by the vehicle. As a result, a roadway charge can be collected without tollbooths, and the users are provided with a more convenient method of paying for the usage of the roadway.

Intelligent roadway system 5 includes roadway 10 which may have entering point 12 and exiting point 14, vehicle 50, wireless device 52 on vehicle 50, and communication means 54 associated with wireless device 52. Communication interface means 54 can either be an audible speaker or a visible display that can be used in a non-distracting manner. Wireless device 52 may be a cellular phone, personal communication service (PCS) device or other wireless device that has the ability to have an individual identification and to send and receive information to a stationary landbase, mobile receiver and transmitter or satellites. Wireless device 52 may be installed on vehicle 50 for example by the manufacturer or may be a portable wireless device carried by an operator or occupant ("user") of vehicle 50.

Intelligent roadway system 5 further comprises mobile switching center (MSC) 100 and base stations 102, 104, 106 which enable wireless communication with a wireless device. Each of base stations 102, 104, 106 covers cells 108, 110, 112, respectively. The general operations of the MSC and the base stations involving cellular communications are well known and will not be described in greater detail herein. MSC 100 may further include host system 200.

Host system 200 is configured to control intelligent roadway system 5 in cooperation with other parts of the roadway system. Host system 200 performs functions such as identifying wireless device 52, creating an account for the user of vehicle 50, tracking the path of vehicle 50, providing road services to the user of vehicle 50, determining or monitoring a usage fees for using roadway 10 and charging to the account of wireless device 52.

Host system 200, particularly processor 220, is configured to perform the various operations herein, such as those described below with reference to FIGS. 4–6. Host system 200 may resides inside MSC 100 in the embodiment shown in FIG. 1, but may be separate from MSC 100 and located independently.

FIG. 2 illustrates a block diagram of a host system 200 of FIG. 1. Host system 200 comprises interface 210, processor 220 and storage block 230. Interface 210 enables communications with other components of MSC 100 as well as with wireless device 52 on vehicle 50. Storage block 230 comprises multiple databases 232, 234 for maintaining different types of information. For example, database 232 maintains at least one user account 236 which store the user's travel information on roadway 10 and database 234 maintains information on road services such as direction guide, road condition, weather and traffic.

FIG. 3 is an example of user's account 236 of database 232 created and maintained by host system 200 as shown in FIG. 2. Account 236 comprises travel information section 302 and transaction section 304. Travel information section 302 includes fields regarding ESN ("Electronic Serial Number") 310, wireless device number 315 associated with the ESN, vehicle class 320 associated with wireless device 52, entering point and time 325, exiting point and time 330 and services provided 335.

Transaction section 304 includes fields regarding toll 340, maintenance cost 345 and transferring destination for billing information 350. Each field may be filled with appropriate information whenever it is available. Account 236 may include more or less fields as desired.

The operation of intelligent roadway system 5 is described below with reference to FIGS. 1–3 in accordance with one embodiment.

Referring to FIG. 1, vehicle 50 carrying wireless device 52 enters entering point 12 of roadway 10. Base station 102 covering zone 108 is tuned to detect a distinct radio signal from wireless device 52 at entering point 12. Base station 102 is configured to detect the signal strength from wireless device 52 so that it distinguishes whether vehicle 50 is simply in a vicinity of roadway 10 or actually entering through entering point 12. After detecting the radio signal, base station 102 may activate wireless device 52 if the wireless device 52 is in the off-state. Base station 102 then receives the electronic serial number (ESN) of wireless device 52. Subsequently, base station 102 sends the received ESN of wireless device 52 to host system 200 of MSC 100.

Alternatively, the user of vehicle 50 may initiate communication with MSC 100 using wireless device 52 to transmit its ESN to host system 200. The communication may be initiated automatically or upon a user request by pushing a predetermined button on wireless device 52.

Upon receiving the ESN from base station 102, host system 200 identifies wireless device 52 by analyzing the received ESN. Host system 200 identifies the telephone number of wireless device 52. By identifying the telephone number of wireless device 52, host system 200 is able to identify the user and/or vehicle 50 and access the user information such as billing address.

After the identification, host system 200 creates account 236 which is associated with wireless device 52. If an identified wireless device already has an account, host system 200 simply accesses the account. Host system 200 may then start to store information such as the received ESN, the telephone number of wireless device 52, vehicle class and entering point/time by filling out corresponding fields 310, 315, 320, 325 of account 236 as shown in FIG. 3.

Host system 200 then tracks the path of vehicle 50 on roadway 10 by monitoring the communication between wireless device 52 and base stations 102, 104, 106. While vehicle 50 proceeds along roadway 10, communications with wireless device 52 may be handed off between base stations 102, 104, 106. Host system 200 monitors and analyzes the communication information received from base stations 102, 104, 106 to track the path of vehicle 50 on roadway 10. During the hand-off procedure, base stations 102, 104, 106 may activate wireless device 52 if wireless device 52 is in the off-state.

In another embodiment, global positioning system (GPS) may be utilized for tracking vehicle 50. A GPS receiver to receive the signal from the satellite of GPS may be installed on wireless device 52 to obtain position information which may then be sent to host system 200 through base stations 102, 104, 106.

In any event, when vehicle 50 carrying wireless device 52 exits exiting point 14 of roadway 10, base station 106 that covers zone 112 where exiting point 14 is located is tuned to detect a distinct radio signal. Base station 106 is configured to detect the signal strength from wireless device 52 so that it distinguishes whether vehicle 50 is passing in a vicinity of exiting point 14 or exiting through exiting point 14. After detecting the radio signal, base station 106 may activate wireless device 52 if wireless device 52 is in the off-state. Base station 106 then receives the ESN of wireless device 52. Subsequently, base station 106 sends the received ESN of wireless device 52 to host system 200 of MSC 100. Host system 200 stores information associated with exiting point 14 and time in corresponding field 330 of account 236 of FIG. 3.

Alternatively, the user of vehicle 50 may contact host system 200 to inform it of the termination of the trip on the roadway.

Upon completion of storing travel information section 302 of account 236, host system 200 may send account 236 to the user's home location register for further bill processing if MSC 100 is not the user's home MSC. That is, the billing-related information may be forwarded to a host system associated with the user's home MSC.

Based on the travel information stored on travel information section 302 of account 236, host system 200 determines a usage fee for using roadway 10 by vehicle 50. Host system 200 may consider the path of the trip on roadway 10 by vehicle 50, road services provided and the class of vehicle 50 for the calculation of the usage fee. The calculation may reflect a flat or variable toll for the trip by vehicle 50, or, if necessary, maintenance cost such as repairing or building new roadways and/or bridges to deal with increased traffic may be included. Host system 200 then stores the determined billing information on transaction section 304 of account 236.

Subsequently, host system 200 charges the user's account and creates a bill for the usage of roadway 10 by vehicle 50. The usage fee may indicate only a flat or variable toll for the trip on roadway 10, or it may include maintenance cost as well. The usage fee may be charged each time the usage occurs or it can be accumulated over a period of time. The regular postal billing process or electronic process may be used to sent the bill.

If the user of vehicle 50 has selected a different billing authority, host system 200 transfers the billing information on account 236 to the predetermined billing authority. The billing authority may be the service provider of wireless device 52, a credit/debit card company or an intemet-based billing company selected by the user of vehicle 52. An appropriate billing procedure according to the selected billing authority may thereafter be followed.

While the system and method herein is discussed in the above embodiment with reference to the usage of a roadway between two points, vehicle 50 can be detected and tracked anywhere on roadway 10 and charged accordingly. For example, vehicle usage may simply be ascertained based on a single or multiple portion identification of the vehicle on the roadway, and a usage charge may be applied accordingly.

While vehicle 50 is on roadway 10, host system 200 may also provide road services to the user of vehicle 50 interactively. The user of vehicle 50 may request road services such as route alternatives to a certain destination, road condition reports, traffic and weather reports. The user of vehicle 50 may also provide information to host system 200 so that host system 200 can update the service information for other users of roadway 10.

For example, host system 200 may provide the user of vehicle 200 with requested road services. Or, traffic jams on roadway 10 can be reported to host system 200 quickly by another user driving in the opposite lane and direction on roadway 10. The interactive services enable the users of roadway 10 to access more timely and updated information for travel. Host system 200 may store information associated with the usage of services by the user of vehicle 50 by filling field 335 of account 236 of FIG. 3. Additionally, a user may be charged for the usage of the above services provided by host system 200.

Various aspects of operational examples of intelligent roadway system 5 will now be described with reference to FIGS. 4–6.

Figure 4:
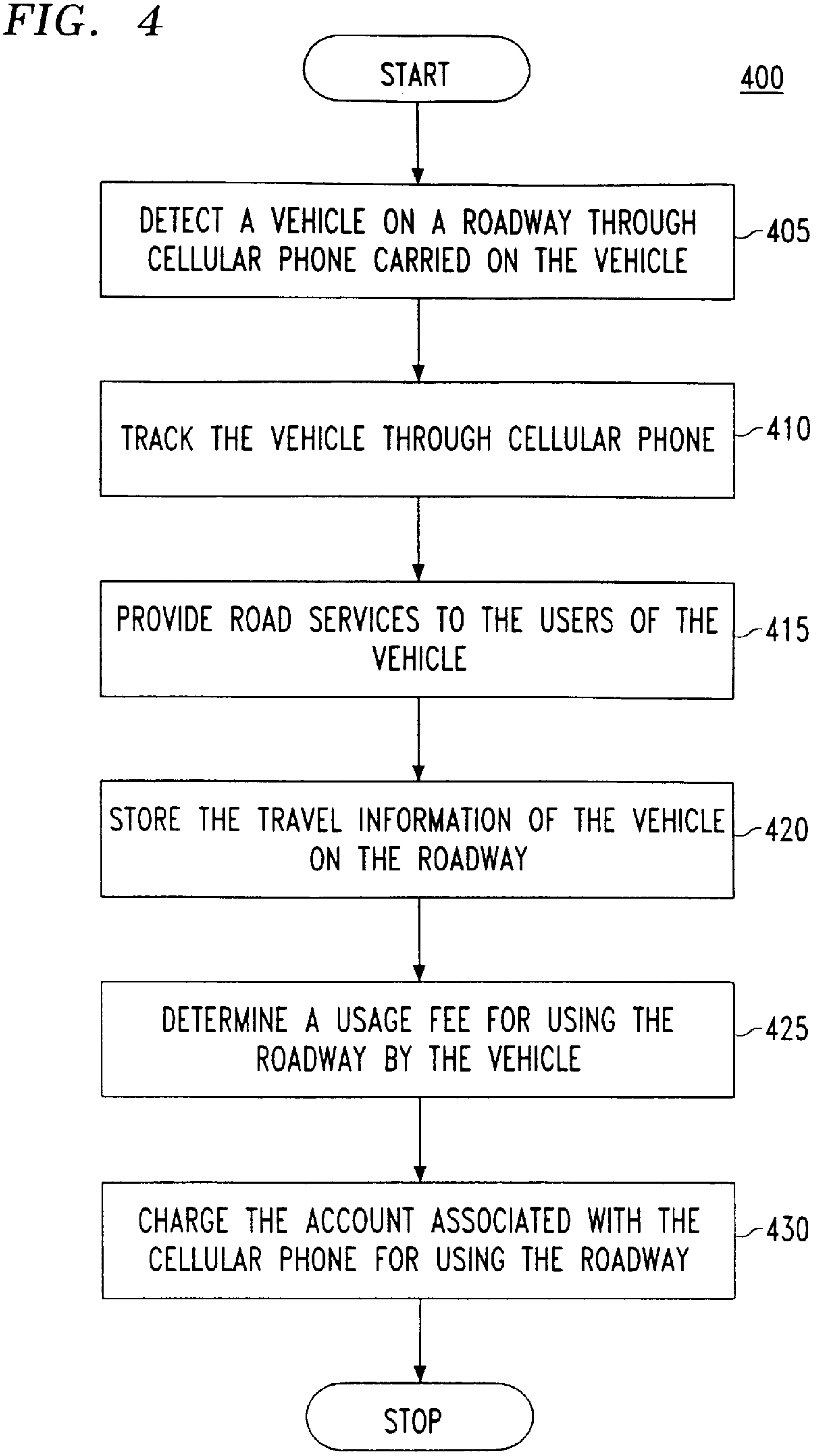
FIG. 4 is a flow chart illustrating a general process by which the intelligent roadway system tracks and charges a user for roadway usage.

FIG. 4 is a flow chart illustrating a general process 400 by which intelligent roadway system 5 tracks and charges roadway usage of vehicle 50.

At step 405, intelligent roadway system 5 detects vehicle 50 on roadway 10 through wireless device 52 carried on the vehicle.

At step 410, intelligent roadway system 5 tracks vehicle 50 on roadway 10 by monitoring communication between wireless device 52 and base stations 102, 104, 106.

At step 415, intelligent roadway system 5 may also provide interactive services to the user of vehicle 50.

At step 420, intelligent roadway system 5 stores the travel information of vehicle 50 on roadway 10.

At step 425, intelligent roadway system 5 determines a usage fee of roadway 10 for vehicle 50 based on the tracked usage.

At step 430, intelligent roadway system 5 charges a user account for using roadway 10.

Figure 5:
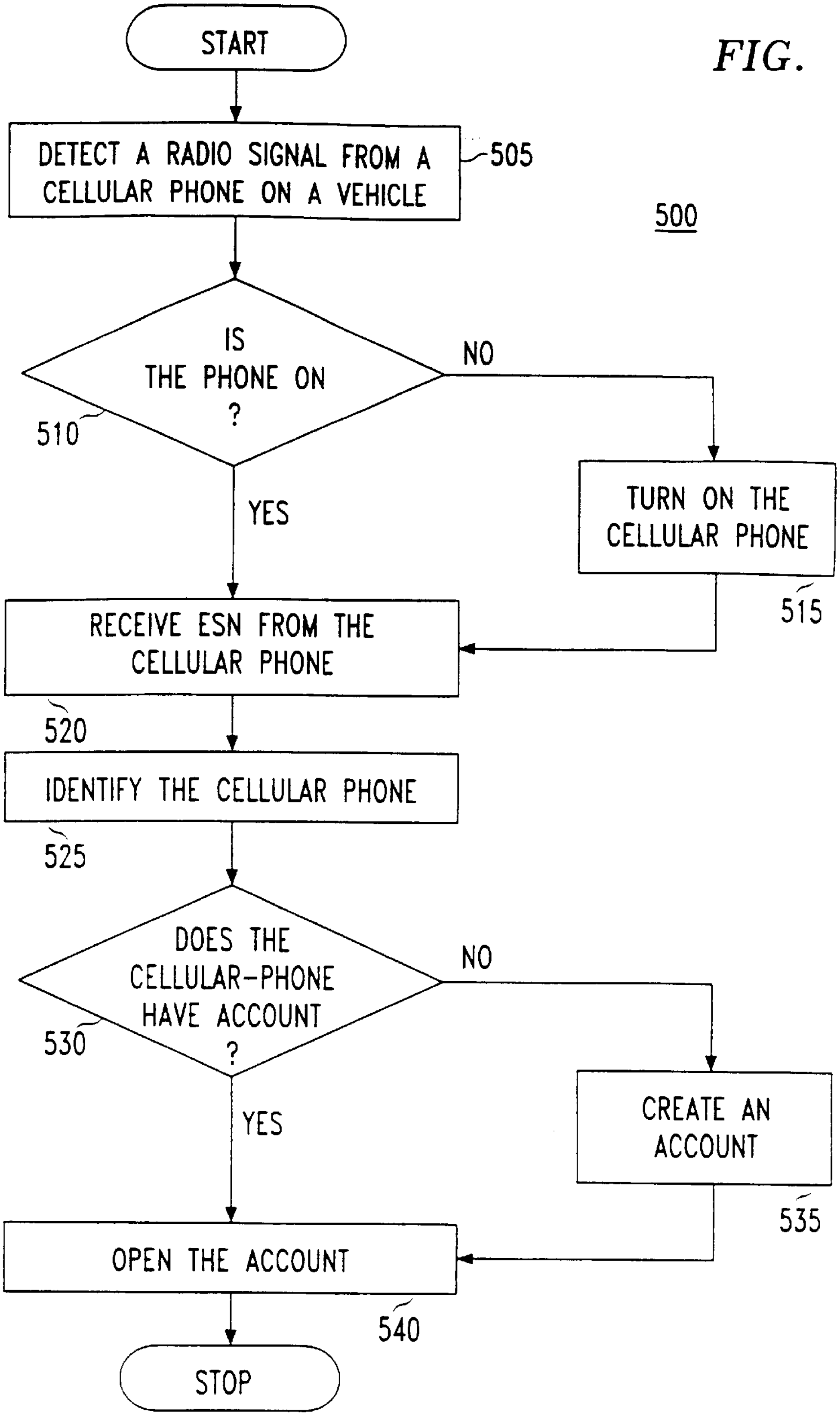
FIG. 5 is a flow chart illustrating a process by which the intelligent roadway system tracks a vehicle entering a roadway.

FIG. 5 is a flow chart illustrating a process 500 by which intelligent roadway system 5 creates or identifies a user account.

At step 505, base station 102 detects a unique radio signal from wireless device 52 carried on vehicle 50 entering into entering point 12.

At step 510, base station 102 determines whether wireless device 52 is turned on.

At step 515, if wireless device 52 is in the off-state, base station 510 can emit signals to turn on wireless device 52.

At step 520, host system 200 receives electronic serial number (ESN) from wireless device 52.

At step 525, host system 200 identifies wireless device by analyzing the ESN.

At step 530, host system 200 determines whether the identified wireless device 52 has an account.

At step 535, if wireless device 52 does not have an account, host system 200 creates one for the wireless device.

At step 540, host system 200 opens the account of wireless device 52.

Host system 200 is now ready to store the travel information on the created account of the user of vehicle 50.

Figure 6:
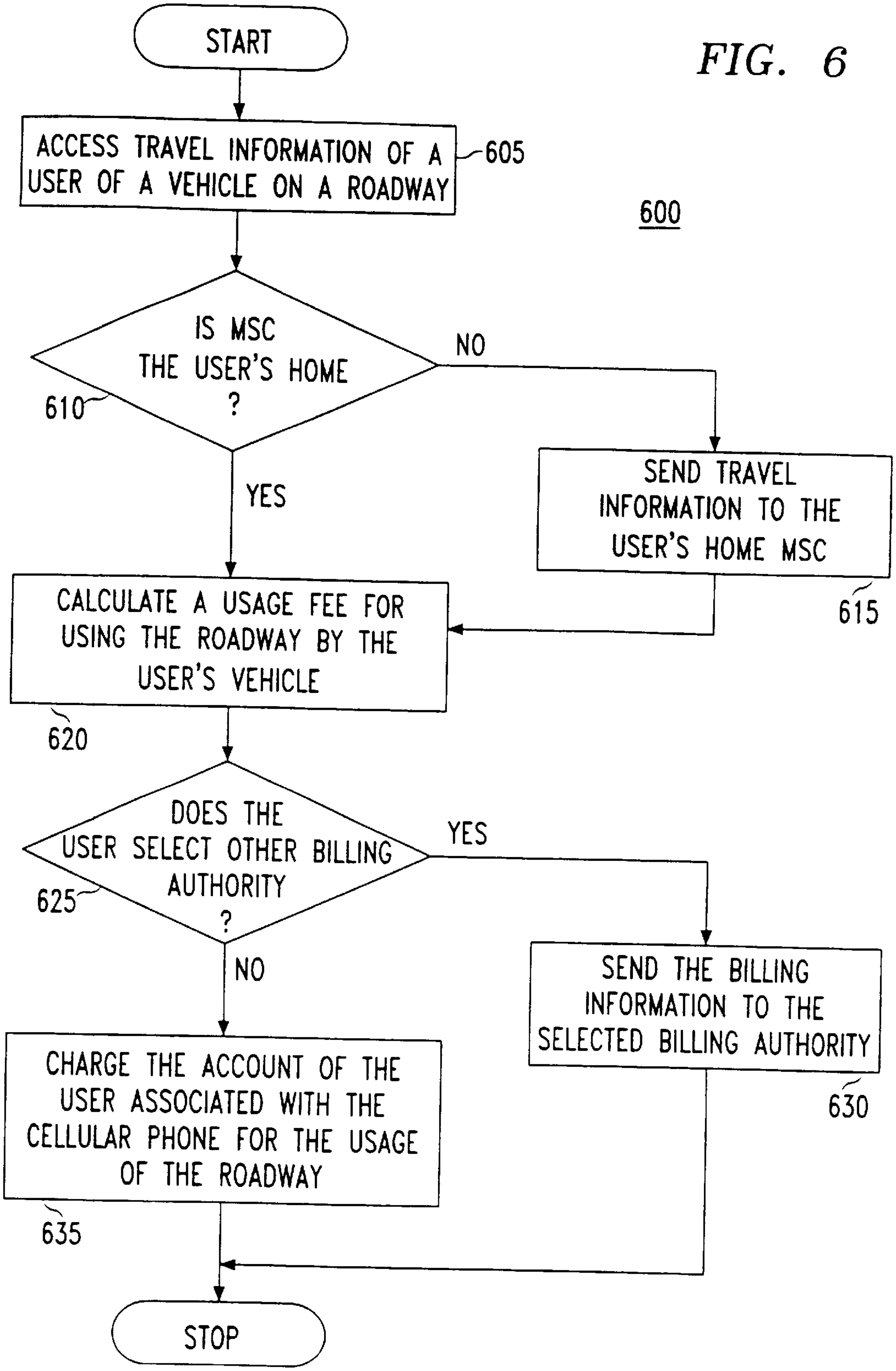
FIG. 6 is a flow chart illustrating a process by which the intelligent roadway system charges a user's account for usage of the roadway in accordance with one embodiment.

FIG. 6 is a flow chart illustrating a process 600 by which intelligent roadway system 5 charges a user account for the usage of roadway 10 in accordance with one embodiment.

At step 605, host system 200 accesses the travel information of the user of vehicle 50 on roadway 10 which is stored on database 232 as shown in FIG. 2. Host system 200 retrieves travel information section 302 of account 236 which includes information fields 310, 315, 320, 325, 330, 335.

At step 610, host system 200 determines whether MSC 100 is the user's home MSC.

At step 615, if MSC 100 is not the user's home MSC, host system 200 sends account 236 to another host system associated with the user's home MSC.

At step 620, host system 200 calculates a usage fee for using roadway 10 based on the travel information on account 236.

At step 625, host system 200 determines whether the user has selected a billing authority different than the service provider of wireless device 52.

At step 630, if the user selected other billing authority different from the service provider of wireless device 52, host system 200 sends the calculated billing information to the selected billing authority.

Otherwise at step 635, host system 200 charges the account of wireless device 52 for the usage of roadway 10.

Intelligent roadway 5 as described above can be maintained without tollbooths and eliminates one of major factor of traffic disturbances. The users of intelligent roadway 5 can be provided with more updated and accurate services during the travel and charged by less annoying method for the travel. The stored travel information of the users of intelligent roadway 5 can be utilized to charge not only for a toll but also a maintenance cost of the roadway by an appropriate maintenance authority.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An intelligent roadway system, comprising:

a wireless communication device carried in a vehicle;

a plurality of base stations configured to communicate with the wireless communication device;

a host system including a mobile switching center for wireless communication with the plurality of base stations, wherein the host system comprises, a storage block including at least one database, wherein the storage block stores at least a user account and a travel information database;

an interface through which a user interacts with the host system, wherein, the host system automatically detects the wireless communication device in proximity to one of the base stations;

the host system automatically remotely activates the wireless communication device when the wireless communication device is in an off-state and is in proximity to one of the base stations;

the host system automatically accesses identification data from the wireless communication device;

the host system uses the identification data to access the user account and the travel information database;

the host system automatically stores travel information regarding the vehicle obtained from the wireless communication device; and the host system provides services to the user based upon data in the user account and the travel information database, wherein the base stations are configured to distinguish a section of a roadway in proximity to the vehicle as an entry point, an exit point, a non-entry point, or a non-exit point of the vehicle.

2. The intelligent roadway system of claim 1, wherein the storage block further stores transaction information including at least roadway tolls and maintenance costs, and wherein the host system automatically applies tolls to the user account based upon the vehicle being in proximity to certain of the base stations at certain times.

3. The intelligent roadway system of claim 2, wherein the transaction information further includes billing information specified by the user.

4. The intelligent roadway system of claim 1, wherein the travel information database includes:

an electronic serial number (ESN) unique to the wireless communication device;

vehicle class;

a location and time the vehicle entered a roadway;

a location and time the vehicle exited the roadway; and services specified by the user.

5. The intelligent roadway system of claim 1, wherein the host system further:

determines whether the storage block includes a user account associated with the wireless communication device; and if not, the host system creates a new user account associated with the wireless communication device.

6. The intelligent roadway system of claim 1, wherein the wireless communication device is selected from a group comprising a cellular telephone and a personal communication device.

7. The intelligent roadway system of claim 1, wherein the user interactively requests services using the interface, wherein the services include:

road conditions;

traffic conditions;

weather conditions; and directions.

8. An intelligent roadway system, comprising:

a wireless communication means carried in a vehicle;

a plurality of fixed base wireless communication means configured to communicate with the wireless communication means;

a host means including a mobile switching means for wireless communication with the plurality of fixed base wireless communication means, wherein the host means comprises, a storage means including at least one database, wherein the storage means stores at least a user account and a travel information database;

an interface means through which a user interacts with the host means, wherein, the host means automatically detects the wireless communication means in proximity to one of the fixed base wireless communication means;

the host means automatically remotely activates the wireless communication means when the wireless communications means is in an off-state and is proximate to one of the fixed base wireless communication means;

the host means automatically accesses identification data from the wireless communication means;

the host means uses the identification data to access the user account and the travel information database;

the host means automatically stores travel information regarding the vehicle obtained from the wireless communication means; and the host means provides services to the user based upon data in the user account and the travel information database, wherein the fixed base wireless communication means are configured to distinguish a section of a roadway in proximity to the vehicle as an entry point, an exit point, a non-entry point, or a non-exit point of the vehicle.

9. The intelligent roadway system of claim 8, wherein the storage means further stores transaction information including at least roadway tolls and maintenance costs, and wherein the host means automatically applies tolls to the user account based upon the vehicle being in proximity to certain of the fixed base wireless communication means at certain times.

10. The intelligent roadway system of claim 9, wherein the transaction information further includes billing information specified by the user.

11. The intelligent roadway system of claim 8, wherein the travel information database includes:

an electronic serial number (ESN) unique to the wireless communication means, a vehicle class;

a location and time the vehicle entered the roadway;

a location and time the vehicle exited the roadway; and services specified by the user.

12. The intelligent roadway system of claim 8, wherein the host means further:

determines whether the storage means includes a user account associated with the wireless communication device; and if not, the host means creates a new user account associated with the wireless communication means.

13. The intelligent roadway system of claim 8, wherein the wireless communication means is selected from a group comprising a cellular telephone and a personal communication device.

14. The intelligent roadway system of claim 8, wherein the user interactively requests services using the interface, wherein the services include:

road conditions;

traffic conditions;

weather conditions; and directions.

* * * * *

UNITED STATES PATENT AND TRADEMARK OFFICE

CERTIFICATE OF CORRECTION

PATENT NO. : 6,744,383 B1 Page 1 of 1
DATED : June 1, 2004
INVENTOR(S) : Joseph Anderson Alfred et al.

It is certified that error appears in the above-identified patent and that said Letters Patent is hereby corrected as shown below:

<u>Column 4,</u>
Line 55, "intemet-based" should be -- internet-based --;

Signed and Sealed this

Seventeenth Day of August, 2004

JON W. DUDAS
*Acting Director of the United States Patent and Trademark Office*